United States Patent Office 3,098,012
Patented July 16, 1963

3,098,012
1,3-DIPHENYLPROPYL CARBAMATE DERIVATIVES
Burton Kendall Wasson, Valois, Quebec, and John Mulvin Parker, Montreal, Quebec, Canada, assignors to Charles E. Frosst & Co., Montreal, Quebec, Canada, a corporation of the Province of Quebec
No Drawing. Filed Sept. 4, 1962, Ser. No. 221,344
1 Claim. (Cl. 167—84.5)

The present invention relates to novel 1,3-diphenylpropyl carbamate derivatives and a method for their preparation.

In the evaluation of new therapies, very often certain difficulties are encountered in that the proposed disease or disorder to be studied cannot always be reproduced in the animals to be tested and it is easily seen that any drug capable of producing any specific disease or disorder in an animal is of great value in the evaluation of new drugs or other therapeutic procedures which are suspected to have certain effects in combatting said disease or disorder.

In accordance with the present invention it has now been found that the novel 1,3-diphenylpropyl carbamate derivatives selected from the group consisting of 1,3-diphenyl-2-propyl carbamate and 1,1-diphenyl-2-propyl carbamate and 1,3-diphenyl-1-propyl carbamate, are particularly useful in producing a state resembling several aspects of Parkinsonian-like rigidity or tremors in experimental animals at a dose which will allow the animal to subsequently recover.

The compounds of the present invention are prepared by reacting 1,1-diphenyl-2-propanol or 1,3-diphenyl-2-propanol or 1,3-diphenyl-1-propanol with phosgene to form the corresponding chlorocarbonate and treating said chlorocarbonate with either anhydrous ammonia or ammonium hydroxide to form the corresponding carbamate.

The compounds of the present invention are relatively non-toxic as can be seen from Table 1.

TABLE 1

$LD_{50}$ by Intraperitoneal Injection in Mice

| | $LD_{50}$, gm./kg. |
|---|---|
| 1,1-diphenyl-2-propyl carbamate | 0.9 |
| 1,3-diphenyl-2-propyl carbamate | 1.6 |
| 1,3-diphenyl-1-propyl carbamate | 1.5 |

It has also been found that when the 1,3-diphenyl-2-propyl carbamate is given intraperitoneally to cats at 250 mg./kg., there is produced a stiffening of the limbs and tremors beginning ten minutes after injection and progressing in intensity. After sixty minutes the animals are unable to walk and their legs are stiff and extended. Both extensor and flexor muscles are affected. This rigidity is accompanied by tremors and strabismus. The effects obtained with 1,1-diphenyl-2-propyl carbamate by intraperitoneal injections to cats at 130 mg./kg. consist of a rapid onset of tremors which are accentuated by environmental stimuli.

When administered intraperitoneally to cats at 500 mg./kg. the 1,3-diphenyl-1-propyl carbamate produced a stiffening of the limbs and tremors beginning ten minutes after injection and progressing in intensity. After sixty minutes the animals are unable to walk and their legs are stiff and extended. This state is continued for five or six hours.

EXAMPLE I.—1,3-DIPHENYL-2-PROPYL CARBONATE

Phosgene (42.3 grams) was collected at −10° C. to 0° C. in 150 ml. tetrahydrofuran. 1,3-diphenyl-2-propanol (60.5 grams) was dissolved in 120 ml. tetrahydrofuran and added dropwise under good stirring during thirty minutes to the phosgene solution maintained at about 0° C. The mixture was stirred at this temperature for forty-five minutes and then twenty minutes at room temperature. The mixture was added during 1.75 hours to 160 ml. concentrated ammonium hydroxide and 5.0 grams sodium bisulfite at −10° C. to 5° C. The mixture was stirred for about ten minutes in the cold, and then thirty minutes at room temperature. The reaction mixture was treated with distilled water to dissolve the salts, and the tetrahydrofuran and ammonia was distilled at water pump vacuum. The residue was extracted with ethyl ether, the ether extract was washed with water to neutrality, the ether was distilled, and the residue, when dried, amounted to 70.0 grams having a melting point of 92–101° C. Recrystallization of this crude product from methanol gave 1,3-diphenyl-2-propyl carbamate as white crystals, melting at 99–101° C. Further recrystallization raised the melting point to 101.5–103.5° C.

EXAMPLE II.—1,1-DIPHENYL-2-PROPYL CARBAMATE

A solution of 46.5 grams of 1,1-diphenyl-2-propanol dissolved in 92 ml. of tetrahydrofuran was added during 25 minutes at −4° to 3° C. to a stirred solution of 32.4 grams of phosgene in 115 ml. tetrahydrofuran. The solution was stirred a further 15 minutes at −4° to 3° C. and finally 30 minutes at room temperature. The solution of 1,1-diphenyl-2-propyl chlorocarbonate was added dropwise during 2 hours to 85 ml. of concentrated ammonium hydroxide maintained at 10° to 20° C. Water was added to dissolve the salts. The ammonia and tetrahydrofuran were removed in vacuo. The residue was extracted with ethyl ether, the ethereal extracts washed with water, and distillation of the solvent afforded 53.2 grams of crude product. Recrystallization of these solids from methanol-water gave 44.1 grams of 1,1-diphenyl-2-propyl carbamate as white crystals, M.P. 86–88° C. An analytical sample of 1,1-diphenyl-2-propyl carbamate had a M.P. of 88–89° C.

Analysis of this compound gave: C, 75.42%; H, 6.51%.
Calculated for $C_{16}H_{17}NO_2$: C, 75.28%; H, 6.71%.

EXAMPLE III.—1,3-DIPHENYL-1-PROPYL CARBAMATE

A solution of 8.4 grams of 1,3-diphenyl-1-propanol dissolved in 50 ml. of tetrahydrofuran was added during one hour at −5° to 5° C. to a stirred solution of 7.8 grams of phosgene in 115 ml. of tetrahydrofuran. The solution was stirred a further thirty minutes in an ice bath. The solution of 1,3-diphenyl-2-propyl chlorocarbonate was added dropwise during one hour to 39 ml. of concentrated ammonium hydroxide maintained at a temperature below 15° C. The ammonia and tetrahydrofuran were distilled in vacuo. The residue was extracted with ethyl ether, the ethereal extracts washed with water, and the solvent partially evaporated to give 9.3 grams of 1,3-diphenyl-1-propyl carbamate as white crystals, M.P. 94–97° C. Recrystallization from ethyl ether-petroleum ether (30–60° C.) gave an analytical sample, M.P. 102–103° C.

Analysis.—Percent calculated for $C_{16}H_{15}NO_2$: N, 5.49.
Found: N, 5.36.

This application is a continuation-in-part application of U.S. applications Serial Numbers 838,824, filed September 9, 1959 (now abandoned), 10,068, filed February 23, 1960 (now abandoned), and 81,704, filed January 10, 1961 (now abandoned).

We claim:
A method of inducing in an experimental animal a state resembling Parkinsonian-like rigidity comprising administering to said animal a dose of from about 130 to about 500 mg./kg. of a 1,3-diphenylpropyl carbamate selected from the group consisting of 1,3-diphenyl-2- propyl carbamate, 1,1-diphenyl-2-propyl carbamate and 1,3-diphenyl-1-propyl carbamate.

References Cited in the file of this patent

UNITED STATES PATENTS

| 2,261,169 | Lott | Nov. 4, 1941 |
| 2,771,485 | Weihe | Nov. 20, 1956 |
| 2,827,479 | Hodge | Mar. 18, 1958 |
| 2,878,158 | Stuehmer | Mar. 17, 1959 |
| 2,884,444 | Berger | Apr. 28, 1959 |
| 2,890,985 | Marsh | June 16, 1959 |
| 2,891,890 | Adamson | June 23, 1959 |

OTHER REFERENCES

Kametani: J. Pharm. Soc., Japan, vol. 72, pp. 81–85, 1952.

Chem. Abst., vol. 46, p. 11208(b), 1952.

Chem. Abst., 5th Decennial Index, page 2532(s), 1946–1956.